US006844702B2

(12) United States Patent
Giannopoulos et al.

(10) Patent No.: US 6,844,702 B2
(45) Date of Patent: Jan. 18, 2005

(54) SYSTEM, METHOD AND APPARATUS FOR CONTACT-LESS BATTERY CHARGING WITH DYNAMIC CONTROL

(75) Inventors: Demetri Giannopoulos, Norwalk, CT (US); Qiong M Li, Cortlandt Manor, NY (US); Nai-Chi Lee, Cortlandt Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/146,770

(22) Filed: May 16, 2002

(65) Prior Publication Data

US 2003/0214821 A1 Nov. 20, 2003

(51) Int. Cl.⁷ .................................................. H02J 7/00
(52) U.S. Cl. ....................................................... 320/108
(58) Field of Search ................................ 320/108, 109, 320/140

(56) References Cited

U.S. PATENT DOCUMENTS

| | | | |
|---|---|---|---|
| 5,300,875 A | 4/1994 | Tuttle | 320/20 |
| 5,341,083 A | * 8/1994 | Klontz et al. | 320/109 |
| 5,568,036 A | * 10/1996 | Hulsey et al. | 320/108 |
| 5,654,621 A | * 8/1997 | Seelig | 320/108 |
| 6,118,249 A | 9/2000 | Brockmann et al. | 320/108 |
| 6,160,374 A | 12/2000 | Hayes et al. | 320/108 |
| 6,173,899 B1 | 1/2001 | Rozin | 235/492 |
| 6,184,651 B1 | 2/2001 | Fernandez et al. | 320/108 |
| 6,301,128 B1 | 10/2001 | Jang et al. | 363/17 |

FOREIGN PATENT DOCUMENTS

FI   20002493   5/2002

OTHER PUBLICATIONS

S.C. Tang, "A Low–Profile Low–Power Converter with Coreless PCB Isolation Transformer", vol. 16, No. 3, Mar. 3, 2001, pp. 311–315, IEEE Transactions on Power Electronics.

* cited by examiner

*Primary Examiner*—Shawn Riley
(74) *Attorney, Agent, or Firm*—Aaron Waxler

(57) ABSTRACT

A system, method and apparatus for contact-less charging of battery operated devices, including a host charger with a power converter and resonant tank circuit and a portable device where the battery is located, with a battery charging control IC, wherein the method obviates the need for a voltage controller in each of both the host and the portable stages. The charging of the battery in the portable device is controlled by a charging controller therein, which is in continual electric communication with the host, whose output power the control IC dynamically monitors and controls. In one embodiment, component count is minimized but battery charging is not optimized when the battery voltage is very low. In the other embodiment, charging efficiency is maximized regardless of the output voltage of the battery.

19 Claims, 4 Drawing Sheets

US 6,844,702 B2

SYSTEM, METHOD AND APPARATUS FOR CONTACT-LESS BATTERY CHARGING WITH DYNAMIC CONTROL

TECHNICAL FIELD

This invention relates to power supplies, and in particular, to the contact-less charging of battery operated portable devices.

BACKGROUND OF THE INVENTION

Electronic devices, both consumer and commercial, are increasingly portable. One carries their telephone, PC, pager (to the extent anyone still has one), PDA, GPS decoder, and a myriad of other devices. Each of these devices requires a portable power source. For reasons of ease of use and economic efficiency, the power source of choice is a rechargeable battery.

Contact-less energy transfer can be used to eliminate the cost of a connector and associated reliability problems in providing power to recharge battery-operated portable electronic devices. Typically, existing contact-less battery charging methods use a two-stage solution. In the first stage of the system, located on a host charging circuit on an external device, a first controller or regulator is used to generate a voltage. This voltage, which is usually not very accurate, is then transferred to a secondary stage located on the portable device where the battery being charged is found. The second stage requires an additional controller or regulator to manage the current charging the battery. An example of such a two stage energy transfer system, is described in U.S. Pat. No. 6,301,128 B1. Although not directly addressing battery charging, the use of a two-stage system for energy transfer is well illustrated.

The use of such a two-stage power conversion system increases the costs of the charging system, increases the complexity and size of the portable device, and decreases the efficiency of the power conversion. Moreover, as stated above, the voltage coming off of the host first stage tends to be inaccurate. This is due to the fact that if there is no direct feedback from the secondary side, the primary side simply cannot have an accurate representation of the output voltage/current. In such circumstance the regulation is simply not as accurate, inasmuch as there is an attempt to control an output without accurately monitoring it. What is needed is an improved method of contact-less power conversion that obviates the cumbersome requirements of the prior art, increases accuracy in the generated charging voltage, and increases efficiency.

SUMMARY OF THE INVENTION

A system, method and apparatus for contact-less charging of battery operated devices is presented. There is a host charger with a power converter and resonant tank circuit and a portable device where the battery is located, with a battery charging control IC. The method obviates the need for a voltage controller in each of both the host and the portable stages, thus decreasing complexity and increasing efficiency. The charging of the battery in the portable device is controlled by a charging controller therein, which is in continual electric communication with the host, whose output power the control IC dynamically monitors and controls. Two embodiments for the charging circuitry in the portable device are presented. In one embodiment component count is minimized but battery charging is not optimized when the battery voltage is very low. In the other embodiment charging efficiency is maximized regardless of the output voltage of the battery, but additional components are utilized.

DETAILED DESCRIPTION OF THE PREFERRED EMBODIMENTS

Figure 1:
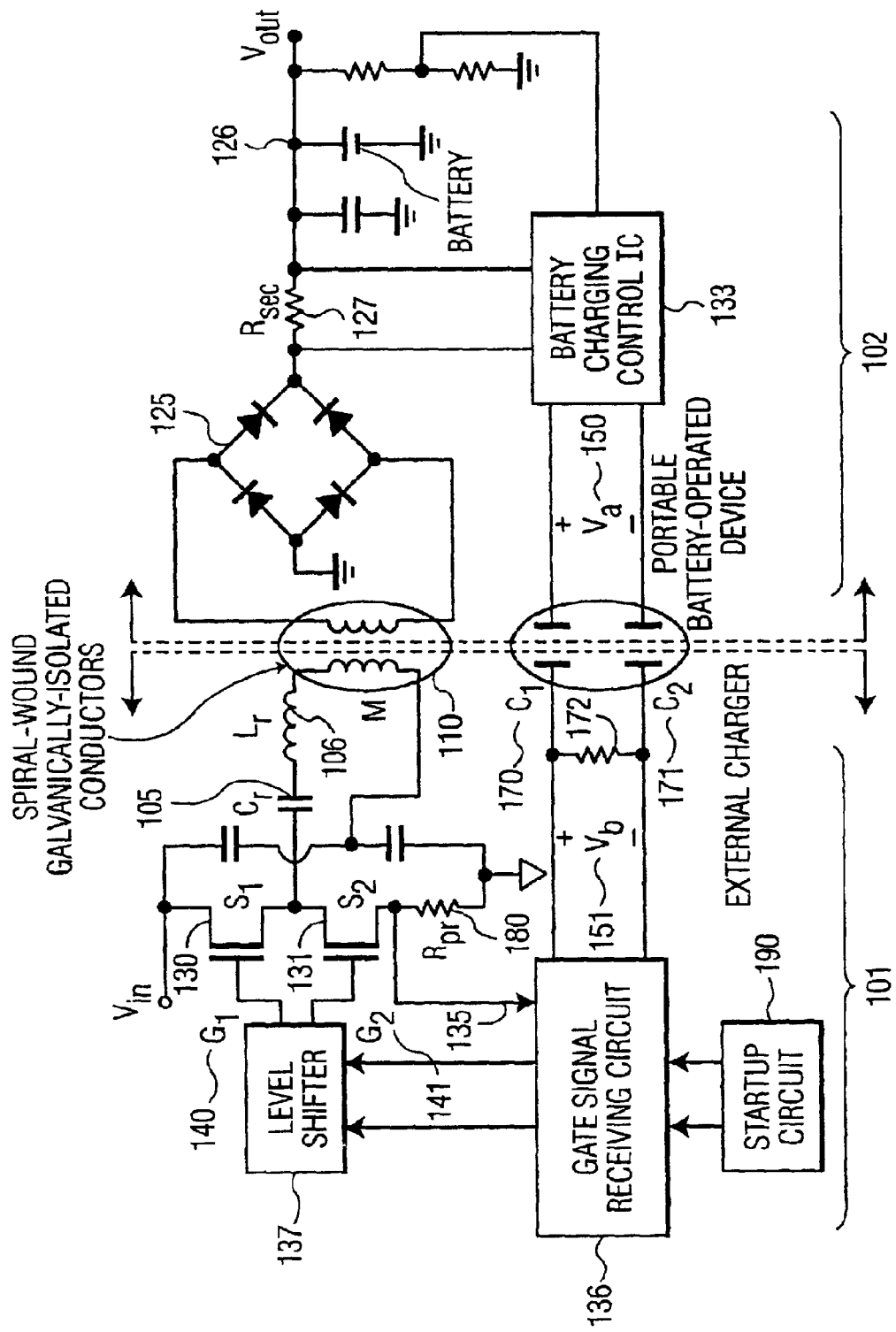
FIG. 1 depicts a single-stage contact-less charging system according to the present invention.

Before one or more embodiments of the invention are explained in detail, it is to be understood that the invention is not limited in its application to the details of construction or the arrangements of components set forth in the following description or illustrated in the drawings (the terms "construction" and "components" being understood in the most general sense and thus referring to and including, in appropriate contexts, methods, algorithms, processes and sub-processes). The invention is capable of other embodiments and of being practiced or being carried out in various ways. Also, it is to be understood that the phraseology and terminology used herein is for the purpose of description and should not be regarded as in any way limiting.

The described system and method for contact-less battery charging utilizes a single stage power converter. FIG. 1 shows an implementation of the power converter consisting of a host or external charging circuit 101 and a portable battery-powered device 102. The host circuit 101 consists of a series resonant tank circuit driven by a half-bridge power converter. The resonant tank circuit comprises Cr 105 and Lr 106 connected in series, and the energy is conveyed to the portable device via a transformer 110. Different soft-switching topologies can be selected to implement the contact-less battery charging system.

For ease of illustration, the host circuit, which has the primary winding of the transformer 110 in it, will sometimes be referred to herein as the primary side, and the battery powered portable device, which has in it the secondary winding of the transformer, will sometimes be referred to herein as the secondary side.

The problems of the prior art are cured by using a single stage power converter. The use of a single stage is possible because, unlike prior art systems, the controller in the secondary side is in continual electrical communication with the power generation circuitry of the primary side. This continual electrical communication allows the controller on the secondary side to dynamically, and thus efficiently, control the power generation circuitry in the primary side.

Contact-less energy transfer can be achieved using either inductive or capacitive coupling. Unless the load current is of the order of a few microamperes or lower, inductive coupling is preferred since it requires a smaller interface area than capacitive coupling.

Part of the converter is included in the portable battery-operated device 102. It includes a full-bridge rectifier 125, a battery voltage 126 and current sense circuitry 127. It further contains a control IC 133 that implements the charging algorithm of the battery, and a spiral-wound conductor serving as the secondary winding of the transformer 110 used to transfer energy to the portable device.

The host side of the power stage, residing inside the external charger 101, includes power switches S1 130 and S2 131, the capacitor 105 and inductor 106 of the resonant tank circuit and a spiral-wound conductor serving as the primary winding of the transformer 110 formed by the spiral-wound conductors in the two devices (external charger 101 and portable device 102). Alternatively, inductor 106 could be the leakage inductance of the primary side of the transformer 110, and not a separate component. The actual power generating device in the host side can be a half-bridge converter, as shown in the exemplary embodiment of FIG. 1, a full bridge converter, or any other power converter now known or to be known in the future, as may be appropriate.

The control IC 133, which is powered off of the battery, generates an output signal Va 150. This signal is transferred in the form of Vb 151 to the other part of the power stage residing inside the external charger 101. Due to the resistor 172 Vb is proportional to the derivative of Va, or Vb=Rpr * [C1*C2/(C1+C2)]*[dVa/dt]. Thus, as described below, Vb is simply a positive or negative pulse at the rising and falling transitions of the Va signal. The Vb signal 151 is used to control the gates $G_1$ 140 and $G_2$ 141 of the power switches $S_1$ 130 and $S_2$ 132 respectively. As can be seen in FIG. 1, in this exemplary embodiment, Vb is sent to a gate signal receiving circuit 136, whose signals are input into a level shifter 137, which in turn controls the gates G1 and G2 of switches S1 and S2. Other arrangements are possible, as may be known in the art. The waveforms Va, Vb, G1 and $G_2$ and their interplay will next be described with reference to FIG. 4. (It is noted that for ease of the illustration herein, index numbers referring to various figures will be used interchangeably; it is understood that the first digit of any index number identifies the Figure where it appears; thus index numbers beginning with a "1" refer to FIG. 1, those beginning with a "2" refer to FIG. 2, and so on).

Because Va is a digital signal, it does not have the same accuracy requirements as an analog signal. Thus, while in some embodiments of the invention it is possible to place a single controller on the primary side and provide real time feedback to the primary side controller via analog information such as battery voltage and current, in preferred embodiments the controller is placed on the secondary side, and it outputs the logic signal Va which controls the switches of the power converter in the primary side. As is known in the art, logic signals output by an IC controller have less accuracy requirements than analog signals, and are thus preferred as a more robust manner to provide the feedback from the portable device to the host charging device.

Figure 2:
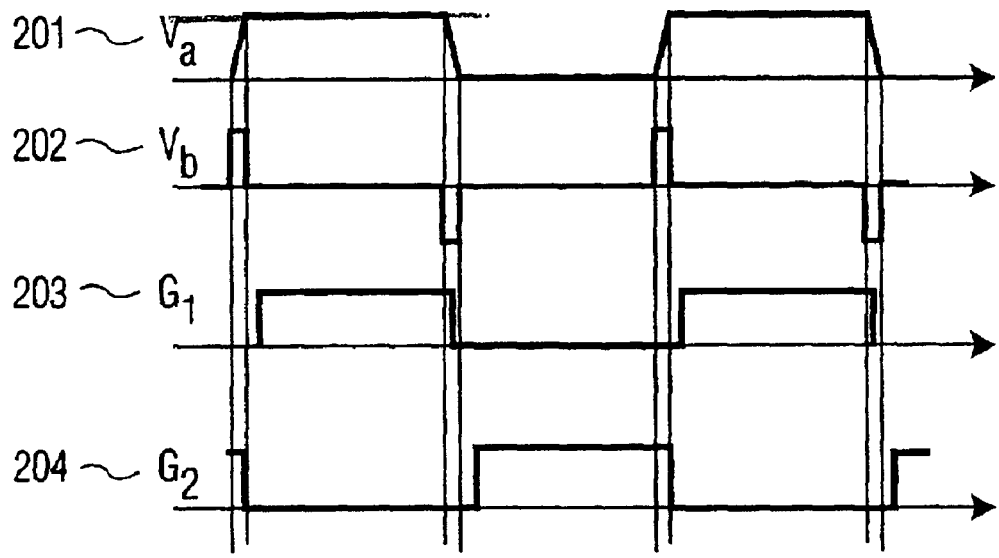
FIG. 2 depicts certain steady state voltage waveforms of the system of FIG. 1.

With reference to FIG. 2, a positive $V_b$ pulse 202 causes G2 204 to go lowturning off the bottom switch $S_2$ 131, and G1 203, after a non-overlap period, to go high, turning on the top switch $S_1$ 130. A negative $V_b$ pulse 202 causes G1 203 to go low, turning off the top switch $S_1$ 132, and G2 204, after a non-overlap period to go high, turning on the bottom switch $S_2$, 131. The non-overlap time between the conduction time of the two switches $S_1$ 130 and $S_2$ 131 protects the switches from cross-conduction. Two capacitors, C1 170 and C2 171, in FIG. 1, formed by plates residing in the external charger 101 and the portable device 102, are used to transfer the gate-controlling signal Va 150, 201 from the portable device 102 to the external charger 101. Va, which is either a logical high or a logical low, as seen in FIG. 2, is transformed via resistor 172 to the positive or negative pulse signal Vb. As can be seen from FIG. 2, Vb is a positive pulse during rising transitions of Va, and a negative pulse during falling transitions of Va. Otherwise, it has no amplitude. The control IC 133 in the portable device thus regulates the power delivered to the battery by controlling the switching frequency of the half-bridge converter via the Va 201 signal. Increasing the switching frequency will decrease the power delivered to the battery. A decrease in the frequency will increase the power delivered to the battery 126. The transformer M 110 and the capacitors $C_1$ 170 and $C_2$ 171 are formed when the portable device and the external charger are placed in close proximity. In preferred embodiments the distance of the conductors in the two devices forming the transformer M 110 and capacitors $C_1$ 170 and $C_2$ 171 in a preferred embodiment will be less than 1 mm.

It is noted that capacitive coupling is used for sending the feedback signal from the secondary to the primary side. Although it is possible to use inductive coupling, coreless inductive coupling results in a small magnetizing inductance which heavily loads the circuit that generates the feedback signal (and thus large currents). The small feedback capacitances represent high impendances (and therefore small currents), which is optimal for signal transmission. Alternatively, if a core is utilized for inductive coupling, which would ameliorate this problem by increasing the magnetizing inductance, there is a corollary increase in cost and size. Thus, in preferred embodiments, capacitive coupling is utilized.

The above description of the operation of the one-stage power converter refers to the steady-state operation of the converter. What will next be described is the start-up process for contact-less energy transfer according to the present invention.

Figure 3:
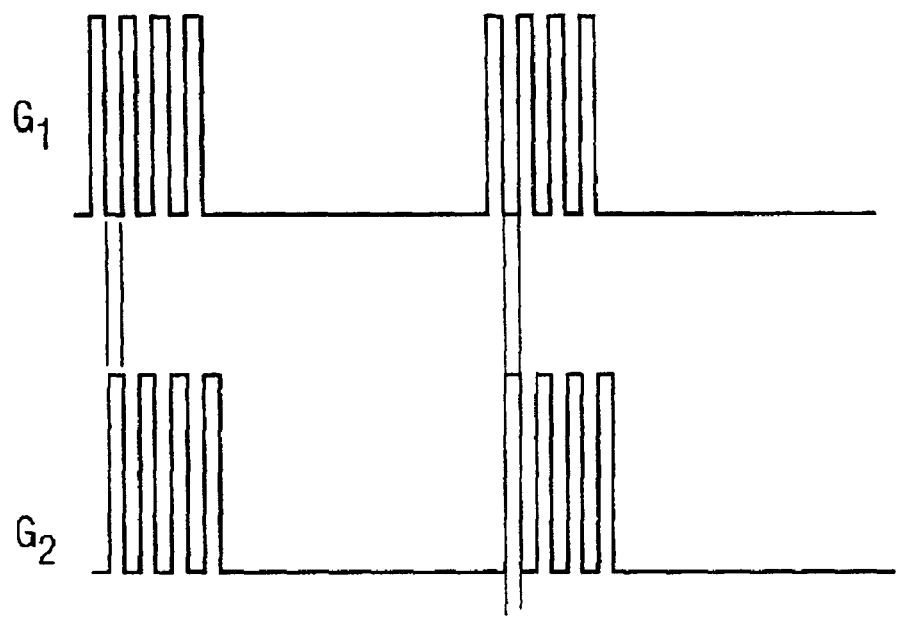
FIG. 3 depicts certain start-up voltage waveforms of the system of FIG. 1.

When the external charger is powered up it will oscillate in burst-mode, as depicted in FIG. 3. When the transformer M and the capacitors $C_1$, $C_2$ are formed by placing the portable device and the external charger in close proximity, the control IC 133 takes control of the energy transfer process if sufficient supply voltage 126 is available from the battery to the IC 133. Specifically, the IC 133 will first detect a current flowing through sensing resistor Rsec 127 while the external charger is switching. Next, it will start regulating the energy flow to the battery from the external charger by controlling the frequency of the signal Va, which, as described above, is transmitted via the feedback capacitors C1 170 and C2 171 and resistor 172 to the host or external charging circuit 101 as Vb, which then controls the switches S1 130 and S2 131 of the half-bridge power converter.

Returning to the portable device 102, the battery charging control IC 133 will not function if the battery 126 is depleted of charge and cannot provide a sufficient supply voltage to the control IC 133. What will be next described is how the embodiment of FIG. 1 operates in such a situation. As well, an alternate embodiment, depicted in FIG. 3, will be presented which, by means of some additional circuitry on the portable device, maintains optimal charging of the battery even when the battery has no voltage and cannot power the IC controller 133. Each of these two embodiments of the charging circuitry in the portable device thus chooses a different side of an engineering tradeoff.

In the embodiment of FIG. 1 a minimum number of components are used, thus minimizing fabrication cost and complexity. However, during the initial charging phase the control IC 133 cannot take control of the energy transfer process due to an insufficient supply voltage Vout 126 from the battery. As a result, the power converter 130, 131 remains in burst mode, and the startup circuit 190 controls the charging, as will be next described.

Figure 4:
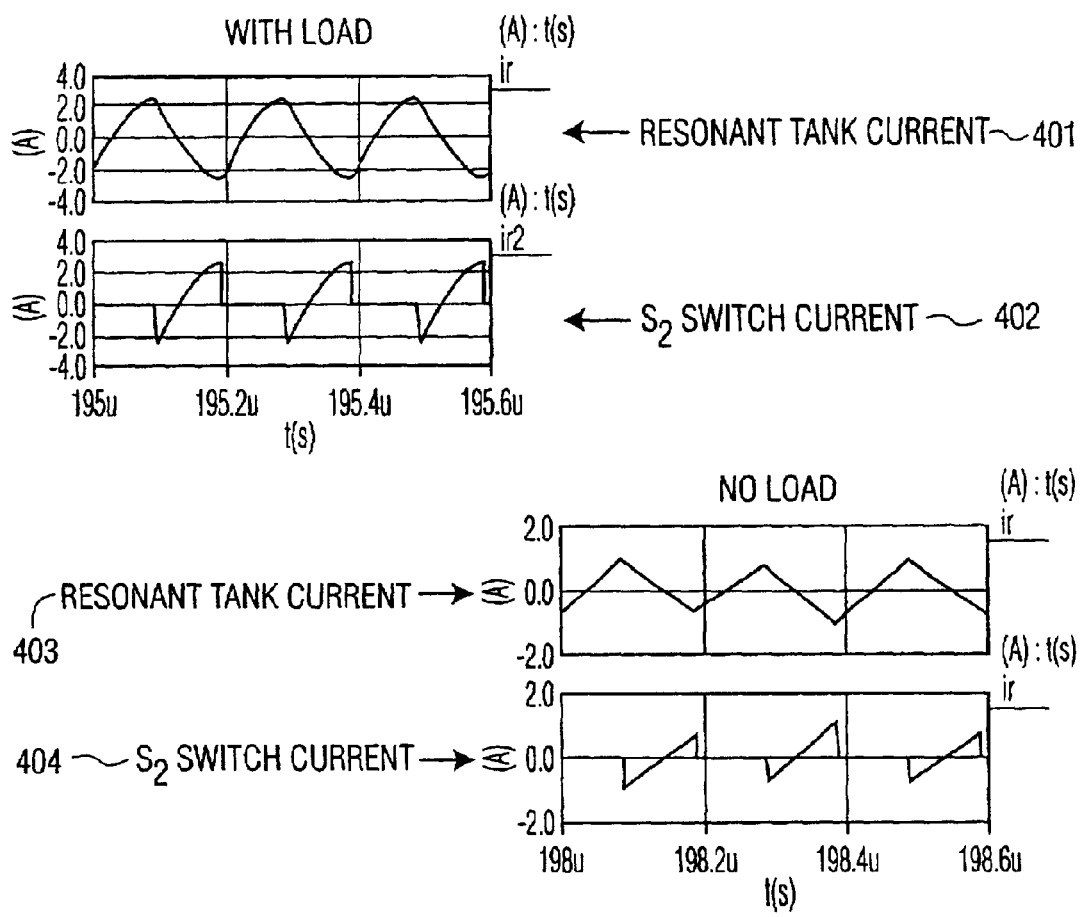
FIG. 4 depicts exemplary resonant tank current and S2 switch current waveforms of the host system, with and without load, according to the present invention.

When the external charger 101 switches in burst mode, it can detect the presence of a load by monitoring the current flowing through the resonant tank Cr 105, Lr 106. This is because the current is significantly higher if there is a battery loading the resonant tank circuit in the external charger. On the other hand, the current in the resonant tank is reduced if the tank is unloaded. Inasmuch as the resonant tank current flows through each of switches S1 130 and $S_2$ 131 during one-half of the switching period, it is possible to sense the magnitude of the resonant tank current by sensing the current through a switch in a half-cycle, and thus determine the presence of a load, i.e. a battery, on the portable side of the charging system 102. In the embodiment of the circuit depicted in FIG. 1, a resistor Rpr 180 is placed in series with switch S2 131 so as to monitor the current through S2 131. FIG. 4 shows, top view for the loaded case, and bottom view for the unloaded case, the overall resonant tank current 401, 403 and the current through switch $S_2$ 402, 404. As can be seen, the S2 current is equal and opposite to the resonant tank current for half a cycle, and zero in the other half cycle.

If no load is detected by the primary side (by monitoring the resonant tank current flowing through $R_{pr}$ 180) then the power converter will remain in burst mode, as depicted in FIG. 3. If a load is detected (by the sensing of Rpr's current via sensing signal pathway 135 which inputs into the gate signal receiving circuit 136) and no $V_b$ signal is present (due to insufficient supply voltage of the control IC 130) then the power converter needs to transfer more energy through the transformer 110 in order to charge the battery (i.e., the detected load). In such case the power converter will operate continuously, now at a high frequency so as to keep the current low enough to be safe, as described below. In this case the startup circuit 190 will regulate the current flowing through $R_{pr}$ 180 by controlling the switching frequency. In the example of FIG. 1 this is effected by the startup circuit 190 sending its signals into the gate signal receiving circuit 136, and ultimately controlling switches S1 and S2. Thus, in this embodiment, the trickle-charge current of the battery is indirectly controlled. Since the external charger does not know the battery type in the secondary side, the trickle-charge current value must be chosen to be safe for all possible battery types. This static setting could result in a longer charging time of higher capacity batteries. Thus, this embodiment is not optimized for the particular type of battery that happens to be used in the portable device.

If both a load is present and the battery outputs sufficient voltage Vout 126 to power the IC 133 then the IC 133 in the portable device will control the switching frequency using the Va signal, as described above, and thus the IC 133 will regulate the energy flow to the battery.

Figure 5:
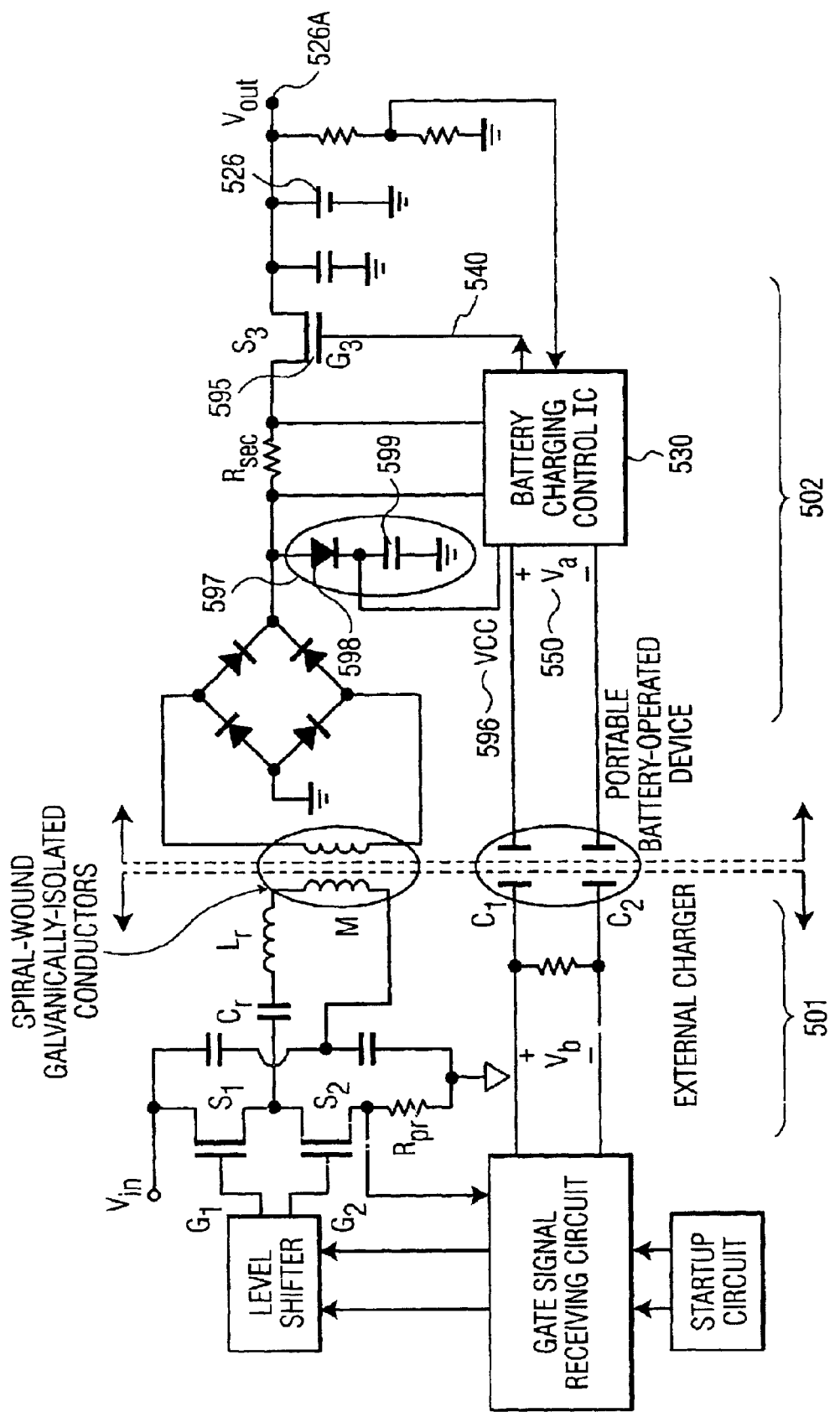
FIG. 5 depicts an alternate embodiment of a single stage charging system according to the present invention.

FIG. 5 shows a second embodiment of the portable device. This implementation requires additional components, and thus costs more to fabricate. However, in this embodiment the control IC 530 always regulates the trickle-charge current of the discharged battery. Thus, the trickle-charge current can be optimized for the battery type installed in the portable device. This second embodiment thus maximizes charging efficiency and thus minimizes charging time.

The second embodiment adds switch S3 595, as well as additional circuitry 597 (comprising a diode 598 and a capacitance 599) in order to provide an alternate voltage supply VCC to the battery charging control IC 530 in the event Vout 526A is low or zero. In the second embodiment, if the battery is discharged (i.e., $V_{out}$ 526A is low or zero) then switch $S_3$ 595 is kept in the off state. When the external charger 501 switches in the burst mode, it provides enough current to power the control IC 530. In turn, the control IC 530 will generate the Va signal 550 to control the switching frequency of the external charger 501 and will allow conduction of switch $S_3$ 595, by means of the gate voltage applied to G3 540. The IC 530 will thus control the switching frequency to regulate its own supply voltage VCC 596. The IC will also control the on impedance of the $S_3$ switch 595 to regulate the trickle-charge of the battery 526. When the battery voltage reaches a sufficiently high value to power the control IC 530 then switch S3 595 is fully turned on and the IC will control the switching frequency of the power converter to regulate the charging current of the battery 526 as in the steady state charging case described above. This embodiment of FIG. 5 ensures that sufficient supply voltage is provided to the control IC 530 before any charging of the battery 526 takes place. Therefore the IC 530 is always in control of the battery charging current.

As can be determined from the above description, inasmuch as the present invention directly sends the gate drive signal, i.e. the signal actually controlling the power converter, from the secondary to the primary side, the need for primary side control is virtually eliminated. Any control on the primary-side has to do with detecting the load presence (for purposes of changing from burst-mode operation, as described above), not the regulation of the charging current. Thus the present invention implements true single stage power conversion control.

While the above describes the preferred embodiments of the invention, various modifications or additions will be apparent to those of skill in the art. Such modifications and additions are intended to be covered by the following claims.

What is claimed:

1. A method of contact-less charging of a portable device's battery from an external host, comprising:
   generating power in the host via a power converter;
   electrically coupling the host to the portable device in a contact-less manner; and
   dynamically controlling power generation in the host from the portable device,
   where the controlling of power generation is accomplished via charging controller in the portable device, and
   where switches of the power converter are capacitively coupled to the charging controller.

2. The method of claim 1, where the dynamic control of power generation is effected via digital signals.

3. The method of claim 2, where the power converter is inductively coupled to battery charging circuitry in the portable device.

4. The method of claim 2, where the power converter is a half-bridge converter.

5. The method of claim 2, where the power converter is a full-bridge converter.

6. A method of contact-less battery charging, comprising:
   driving a discrete resonant tank circuit with a power converter; and
   transferring energy from the discrete resonant tank circuit to a battery charging circuit connected to a battery via a transformer,
   where during charging;
   the discrete resonant circuit and the battery charging circuit are brought into proximity but need not be physically connected, and where the power converter is continually in electronic communication with, and under the dynamic control of, a charging controller located in a portable device.

7. The method of claim 6 where the charging controller utilizes digital control signals.

8. The method of claim 7, further comprising:
sensing an output voltage of the battery prior to charging; and
if the output voltage is too low, diverting power from the charging circuit to power the charging controller.

9. Apparatus for a contact-less battery charger, comprising:
a discrete resonant tank circuit;
a power converter;
a spiral wound conductor; and
two conducting plates;
where in operation the power converter is controlled by a voltage appearing across the two conducting plates.

10. The apparatus of claim 9, where the power converter is a half-bridge power converter.

11. The apparatus of claim 10, where the voltage appearing across the two conducting plates is a logic signal.

12. The apparatus of claim 9, further comprising a resistance connected across the two conducting plates, such that the logic signal is converted to a positive pulse for the duration of a rising transition and a negative pulse for the duration of a falling transition.

13. The apparatus of claim 12, further comprising a resistor in series with one of the half-bridge power converter switches.

14. System for contact-less charging of battery operated portable devices, comprising:
a charger, comprising;
a resonant tank circuit; a power converter;
a first spiral wound conductor; and
a first set of two conducting plates, where the power converter is controlled by a voltage appearing across the two conducting plates; and a portable battery-operated device, comprising:
a second spiral wound conductor;
a battery charging controller;
a full bridge rectifier; and
a second set of two conducting plates; where, when the charger and the portable device are brought into proximity the first and second spiral wound conductors form a transformer, and the first and second set of conducting plates form two capacitors.

15. The system of claim 14, where the battery charging controller controls a charging of a battery via signals sent to the power converter.

16. The system of claim 15, where the signals sent to the power converter are digital.

17. The system of claim 16, where power to charge a battery is transferred from the charger to the portable device via the transformer.

18. The system of claim 17, where the digital signals from the battery charging controller are sent to the power converter via the two capacitors.

19. Apparatus for a contact-less battery charger, comprising:
a resonant tank circuit;
a half-bridge power converter having switches;
a resistor
a spiral wound conductor;
two conducting plates,
where in operation, the power converter is controlled by a voltage appearing across the two conducting plates, wherein the voltage is a logic signal;
wherein a resistance is connected across the two conducting plates, such that the logic signal is converted to a positive pulse for the duration of a rising transition and a negative pulse for the duration of a falling transition; and
wherein a resistor is connected is series with one of the half-bridge power converter switches.

* * * * *